Figure 8:
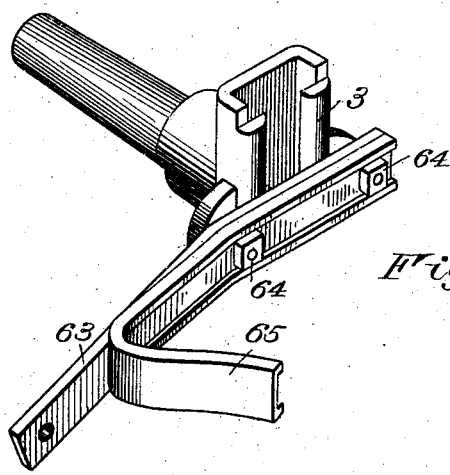

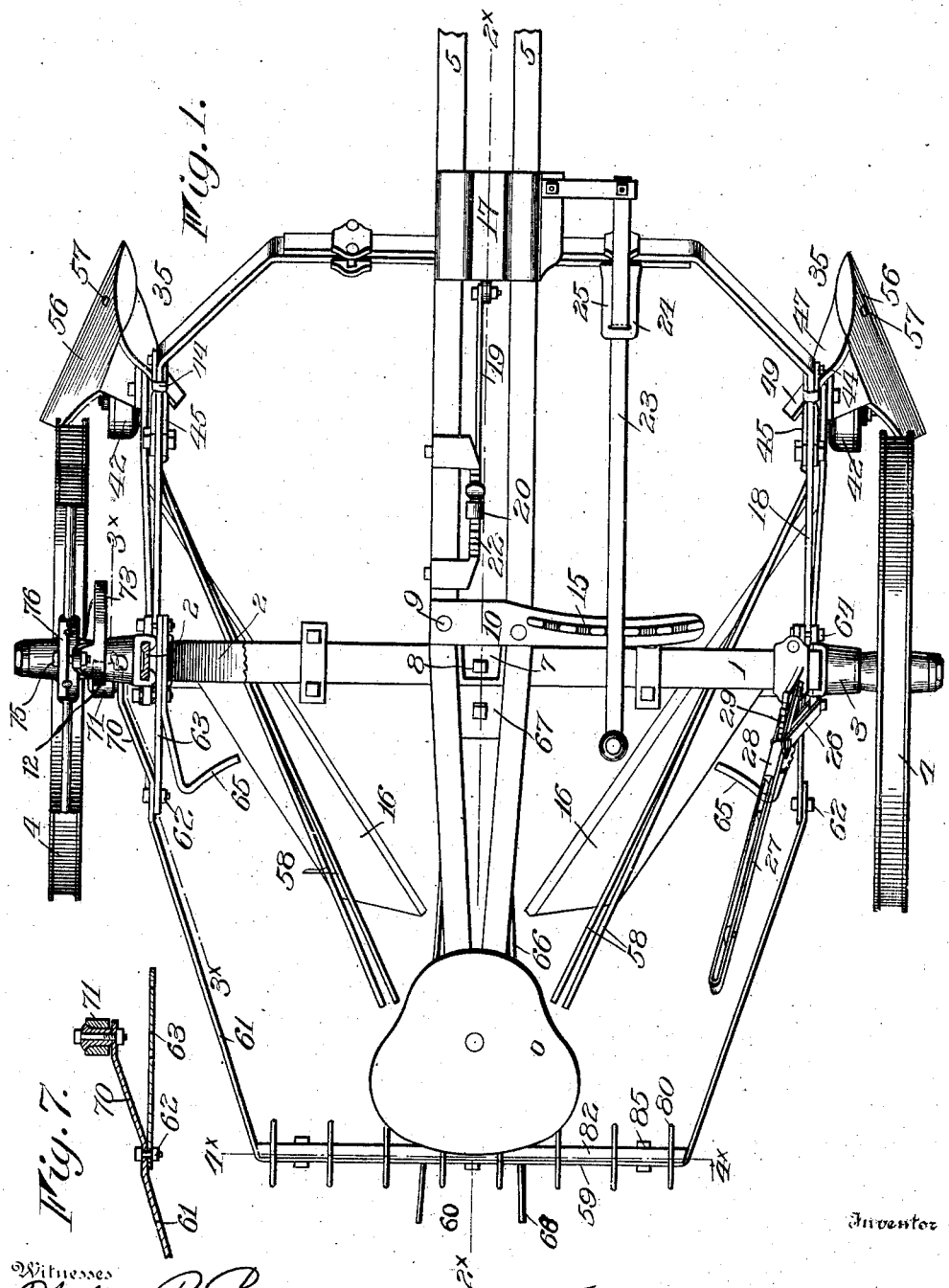

No. 850,482. PATENTED APR. 16, 1907.
F. W. MILLER.
AGRICULTURAL IMPLEMENT.
APPLICATION FILED APR. 6, 1904.
3 SHEETS—SHEET 2.
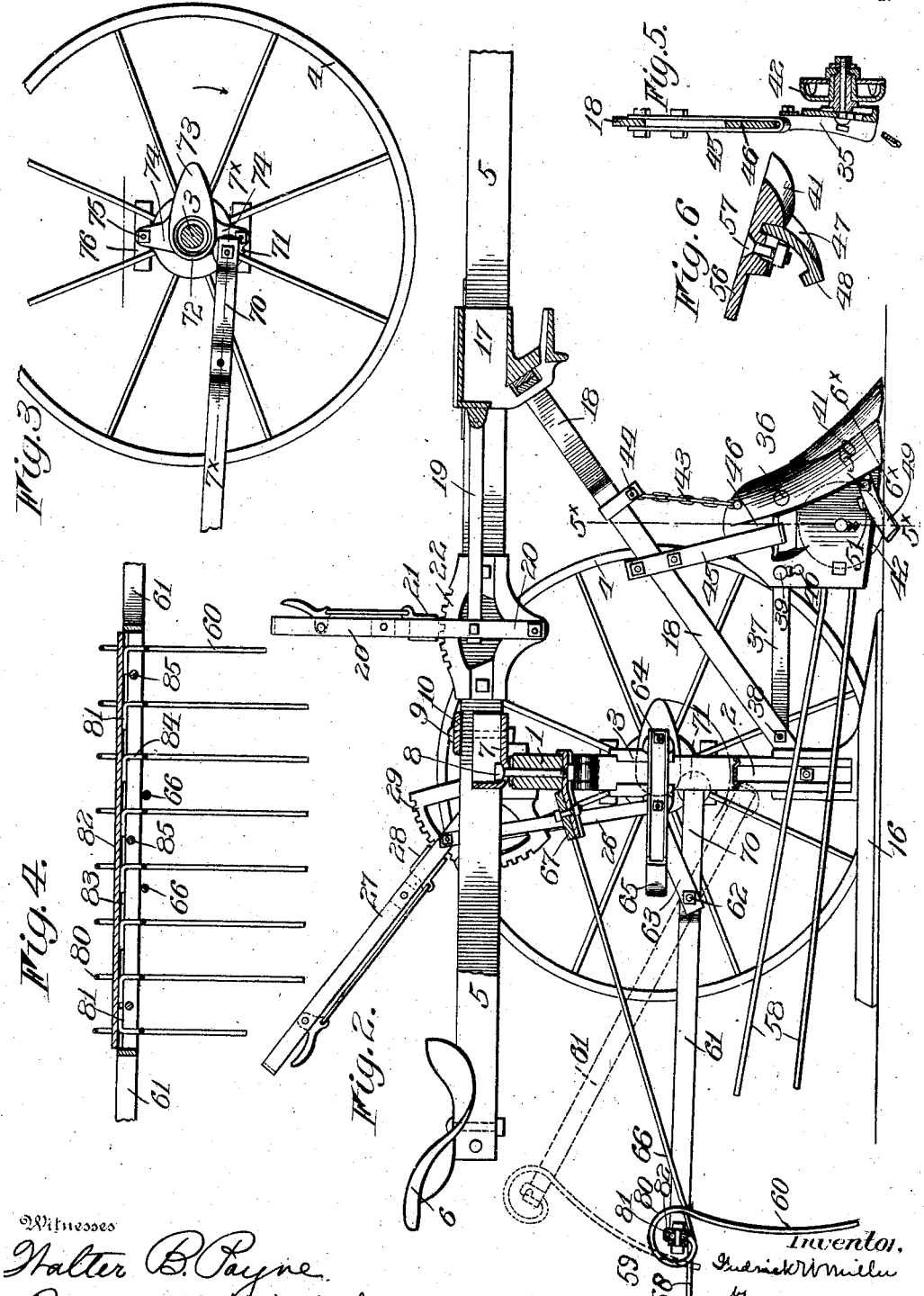

No. 850,482. PATENTED APR. 16, 1907.
F. W. MILLER.
AGRICULTURAL IMPLEMENT.
APPLICATION FILED APR. 6, 1904.

3 SHEETS—SHEET 3.

Witnesses
Walter B. Payne
Florence E. Francis

Inventor
Fredrick W. Miller
By Fredrick F. Church
His Attorney

UNITED STATES PATENT OFFICE.

FREDRICK W. MILLER, OF CALEDONIA, NEW YORK.

AGRICULTURAL IMPLEMENT.

No. 850,482.   Specification of Letters Patent.   Patented April 16, 1907.

Application filed April 6, 1904. Serial No. 201,836.

*To all whom it may concern:*

Be it known that I, FREDRICK W. MILLER, of Caledonia, in the county of Livingston and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

My present invention relates to agricultural implements, and particularly to machines designed for harvesting beans or the like; and it has for its object to provide an implement embodying generally means for separating the vines and severing their roots to permit them to be readily removed from the ground, and gathering and raking devices adapted to pack the vines, leaving them in cocks or bunches free from weeds and stones in readiness to be transported from the field.

To these and other ends my invention consists of certain improvements and arrangements of parts as will more fully appear, the novel features being more particularly pointed out in the claims at the end of this specification.

In the drawings, Figure 1 is a top plan view of an implement constructed in accordance with my invention. Fig. 2 is a longitudinal sectional view on the line $2^\times 2^\times$ of Fig. 1. Fig. 3 is a similar view taken on the line $3^\times 3^\times$ of Fig. 1. Fig. 4 is a sectional view illustrating the method of attaching the rake-teeth and taken on the line $4^\times 4^\times$ of Fig. 1. Fig. 5 is a vertical sectional view taken on the line $5^\times 5^\times$ of Fig. 2. Fig. 6 is a similar view taken on the line $6^\times 6^\times$ of Fig. 2. Fig. 7 is a detail sectional view on the line $7^\times 7^\times$ of Fig. 3. Fig. 8 is a detail perspective view of one of the axle-pieces.

Similar reference-numerals in the several figures indicate similar parts.

In illustrating my invention I have shown it applied to an agricultural implement, portions of which are constructed in accordance with the United States Letters Patent No. 677,250, granted to me June 25, 1901, and embodying generally the main frame or axle 1, on which are mounted downwardly-extending brackets or other supports 2, having the outer vertical faces on which are guided stud-axles or axle-pieces 3, supported in the hubs of the wheels 4. The draft-bar or tongue is composed of the parallel bars 5, joined at their ends and supporting the driver's seat 6 and also connected by a casting 7, through which extends the king-bolt 8, said casting being secured by bolts 9 and a clamping-plate 10, having a laterally-extending arm 15, provided with notches and adapted to be employed for purposes to be further described.

At the lower ends of the brackets or supports 2 are the shares or knives 16, located on opposite sides of the center of the machine and having their proximate cutting edges converging toward their rear ends, as shown in Fig. 1. Connected to a longitudinally-movable head or casting 17, mounted between the bars 5, is a bail, the ends 18 of which extend downwardly and are attached to the lower ends of the supports 2, forming drag-bars for the shares or knives. This head is connected by means of a link 19 to a pivoted lever 20, on which is a latch 21, coöperating with a notched segment 22, whereby the head 17 may be moved longitudinally to raise or lower the draft-bar or tongue of the machine. Also connected to the head is a lever-arm 23, which extends through an aperture 24 in an arm 25, attached to the bail, and having its outer end coöperating with notches or recesses in the arm 15, whereby the tongue or draft-bar may be shifted at an angle to the main frame or axle 1 when the machine is employed for certain classes of work, such as on a hillside or when the rows are crooked.

The adjustment of the shares 16 relatively to the surface of the ground is accomplished by adjusting the brackets or supports 2 vertically on the stud-axles 3, and to this end each of the latter is connected by an arm 26 with an operating-lever 27, pivoted to the main frame or axle 1 and having the latch 28 coöperating with the notched segment 29, and as these adjusting devices are arranged at opposite sides of the machine the sides of the frame may be adjusted independently, so that one or both of the shares may be moved relatively to the surface of the ground.

Located in front of the shares and at the outer sides of the frame of the machine are the dividers 35, each of which is connected by a bolt 36 with a supporting-arm 37, journaled to the frame of the machine, as indicated at 38. The dividers are further secured to the arms by means of bolts 39, the heads of which are adapted to be secured in one of the series of apertures 40, whereby the dividers may be rotated on the bolt 36 to change the angular position of its forward end or point 41 relatively to the surface of the ground. Small wheels 42, resting upon the ground, normally support the dividers, and their downward movement is limited by means of flexible connections, such as chains 43, attached at one end to clips 44, which may be adjusted longitudinally on the draw-bars 18, and the dividers are guided in their upward movement between the parallel sides of a U-shaped strap 45, also secured to the drag-bars and inclosing offset portions 46 at the upper sides of the dividers, as shown particularly in Figs. 2 and 5. The forward end of the divider is rounded, as indicated at 47, and at its inner side it is provided with a shoulder 48, as shown particularly in Fig. 6, and in the rear of this shoulder is arranged a laterally-extending cutting instrument in the form of a knife-blade 49, which is adapted to extend beneath the surface of the ground and when the implement is employed for the purpose of harvesting beans to sever the straggling roots of the vines. The inner end of the cutting instrument is shaped to engage the side of the divider, and it is held in contact therewith by a bolt and nut, as indicated by 50, and engaging the rear edge of the instrument is a lug or projection 51, adapted to hold it in proper operative position. The point 41 is formed upon a detachable side plate 56, which extends outwardly and rearwardly, as shown in Fig. 1, to cover the supporting-wheel 42 and is removably connected by means of a bolt 57, as shown in Fig. 6. Extending rearwardly from the dividers are the spring gathering-rods 58, which project above the shares 16.

The raking or bunching mechanism embodies a rake-frame 59, which extends in rear of the shares and gathering-rods and supports the spring rake-teeth 60, said frame embodying the side portions 61, which are pivoted at 62 to arms 63, extending rearwardly from the stud-axles or axle-pieces 3 and secured thereto by bolts 64, which also extend through and form means for securing the stirrups or supports 65 for the driver's feet. At one side of the machine the rake-frame has an arm 70 extending forwardly beneath one of the axles and carrying at its end a roller 71, with which coöperates a cam attached to one of the wheels 4. This cam (illustrated particularly in Fig. 3) is provided with an aperture through which the axle 3 of the wheel extends, and it has a portion 72 arranged concentric therewith, which, engaging the roller 71, normally holds the rake-frame in the operative position, as shown in Fig. 2, and an operating-point 73 for raising the rake-frame. The cam is adapted to be detachably connected to the wheel, and at its opposite sides it is provided with lugs or extensions 74, through which pass bolts 75, engaging the clamping-plates 76, extending across the outer surfaces of adjacent spokes, as shown in Fig. 3.

Yielding packing-arms 66, adapted to engage the tops of the vines, extend downwardly from the center of the machine, where they are secured to a casting 67, attached to the frame or axle 1 by the bolt 8. The arms slope downwardly, and their outer free ends 68 diverge slightly and are in proximity to the rake-frame and preferably extend beneath it to operate as strippers during the upward movement of the rake-teeth.

The spring rake-teeth 60 extend vertically, and at their upper ends they are provided with loops 80, which terminate in laterally-extending fingers or projections 81. These rake-teeth are removably secured to the rake-frame by means of a clamping-bar 82, provided upon its inner side with longitudinally-extending recesses 83 and with transversely-extending recesses 84, the former being adapted to receive the fingers or projections 81 of the rake-teeth and the latter the portions of the loops 80 adjacent said projections when the bar is secured to the rake-frame by means of securing devices or bolts 85.

In operating the machine for harvesting beans or similar products the dividers extend at the outer sides of adjacent rows of vines and separate them from those at either side, and as the implement is advanced the inclosed rows of vines are turned inwardly, their roots being severed by the cutting instruments or knives 49 and the shares 16, the latter converging toward their rear ends and the converging gathering-rods causing the vines of the separate rows to be gathered together beneath the center of the machine.

The rake-teeth 60, engaging the vines during the time the machine is traveling a distance of one-half the circumference of the wheels 4, will cause them to be bunched, and as the point 73 of the cam engages the roller 71 the rake-frame will be moved upwardly, raising the rake-teeth to the position shown in dotted lines in Fig. 2. As the machine is advancing during the upward movement of the rake-frame, the teeth 60 will be dragged over the accumulated bunch of vines and cause the latter to be rolled a short distance along the surface of the ground, thus separating them from stones and other impediments which may have accumulated.

The improved form of dividers and the raking devices are simple in construction and are capable of being easily applied to machines heretofore constructed, and by employing the cutting instruments on the dividers in conjunction with the converging shares the straggling roots of the vines may be severed and the vines harvested with less difficulty and more thoroughly than heretofore. The raking devices located in rear of the shares and dividers collect the vines in bunches or cocks, thus efficiently accomplishing a feature of the work which it has heretofore been necessary to do either by hand-labor or by the use of a separate apparatus.

I claim as my invention—

1. In an agricultural implement, the combination with a main frame, and supporting-wheels thereon, a rake-frame comprising side portions journaled on the main frame in rear of the centers of the wheels and teeth on said rake-frame, of an arm on one of said side portions of the rake-frame and a device on one of the wheels coöperating therewith to raise the frame.

2. In an agricultural implement, the combination with a main frame and supporting-wheels thereon, of a rake-frame extending rearwardly from the main frame and journaled thereon, rake-teeth on said frame, packing-arms attached to the main frame above the rake-frame and extending rearwardly and downwardly beneath the latter and means for automatically raising the rake-frame.

3. In an agricultural implement, the combination with a main frame and supporting-wheels thereon, of a rake-frame extending rearwardly from the main frame and journaled thereon, rake-teeth on said frame, spring packing-arms attached to the main frame above the rake-frame and extending rearwardly and downwardly into proximity with said frame and a device on one of the wheels coöperating with the rake-frame to operate it.

4. In an agricultural implement, the combination with a main frame and supporting-wheels thereon, of a rake-frame extending rearwardly on the main frame and journaled thereon, rake-teeth on said rake-frame, spring packing-arms attached to the main frame above the rake-frame having the ends extending downwardly beneath the rake-frame and means for operating the rake-frame.

5. The combination with a main frame, axles thereon and wheels journaled on the latter, of a pivoted rake-frame having teeth, a cam adapted to coöperate with the frame and fitting over one of the axles at one side of the wheel, laterally-projecting ears on the cam, clamping-plates bearing against the other side of the wheel and bolts connecting said plates and the ears on the cam.

6. The combination with a main frame having downwardly-extending side brackets and supporting-wheels journaled thereon and a rake-frame in rear of the main frame having forwardly-extending arms, of bearings carried on the main frame and pivotally supporting the ends of said arms, an operating-arm on the rake-frame and a cam carried on one of the wheels and coöperating with the arm.

7. The combination with a main frame having side portions, axle-pieces adjustably mounted on the latter and supporting-wheels journaled on the axle-pieces, of a rake-frame having side arms, journals on the axle-pieces supporting said arms, teeth on said frame and a cam carried on one of the wheels and coöperating with the rake-frame.

8. In an agricultural implement, the combination with a main frame, wheels supporting it, gathering-fingers arranged at opposite sides of the center of the frame and converging at their rear ends, of a pivoted rake-frame having teeth arranged in rear of the gathering-fingers, packing-arms arranged above the latter and extending into proximity with the rake-teeth and means for raising the rake-frame.

9. In an agricultural implement, the combination with a main frame, wheels supporting it, yielding gathering-fingers arranged at opposite sides of the center of the frame and converging at their rear ends, of a pivoted rake-frame having yielding teeth thereon located in rear of the gathering-fingers, spring packing-arms located above the rake-frame and extending rearwardly and downwardly into proximity with the rake-frame and an operating device for raising the latter actuated by one of the wheels.

10. In an agricultural implement, the combination with a rake-frame, a clamping-bar and means for connecting it to the frame, of spring rake-teeth, loops at their upper ends surrounding the frame and bar and lateral extensions on said teeth secured between the bar and frame.

11. In an agricultural implement, the combination with a rake-frame, a recessed clamping-bar and means for detachably connecting it to the frame, of spring rake-teeth, loops at their ends surrounding the frame and bar on the teeth and lateral extensions, lying in the recess in the bar and secured between the latter and the frame.

12. In an agricultural implement, the combination with a rake-frame, a clamping-bar having longitudinally and transversely extending recesses and means for attaching it to the rake-frame of spring rake-teeth provided with loops at their upper ends extending over the bar and lying in the transverse recesses and provided with the laterally-extending ends lying in the longitudinal recesses and secured between said bar and frame.

FREDRICK W. MILLER.

Witnesses:
G. WILLARD RICH,
RUSSELL B. GRIFFITH.